Dec. 4, 1962     M. G. HARWOOD ET AL     3,066,651
POULTRY BLINDER AND FASTENER

Filed Oct. 5, 1961

INVENTORS
MILTON GENE HARWOOD
LOUIS JAY HARWOOD
BY
Harry Ernest Rubens
ATTORNEY 3,066,651
POULTRY BLINDER AND FASTENER
Milton Gene Harwood and Louis Jay Harwood, both of P.O. Box 38, Farmingdale, N.J.
Filed Oct. 5, 1961, Ser. No. 143,220
4 Claims. (Cl. 119—97)

Our invention relates to blinders and fasteners for use on the beaks of poultry, and more particularly to self locking blinders, such as the type shown in our Patent No. 2,437,959.

Blinders are conventionally employed on the beaks of poultry to reduce fighting between birds.

Wire mesh is used to contain the poultry, and sooner or later the birds thrust their heads through the mesh, catching the poultry blinders on the wire. If the blinders are not immediately freed, the birds become frantic and violently tug at the mesh causing considerable injury to their beaks.

Accordingly it is an object of the present invention to devise a poultry blinder that can be easily released from a wire mesh when the bird attempts to withdraw its head.

Another object is to provide a poultry blinder and fastener that can be quickly installed and which will not separate when flaxed.

A further object is to provide a fastener for a poultry blinder that can be easily passed through the nostrils of poultry and which is self locking, when in position.

Figure 1:
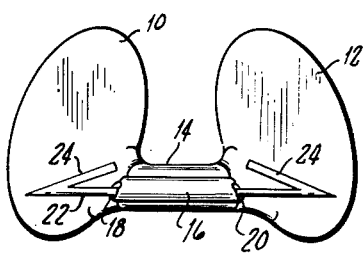
Figure 2:
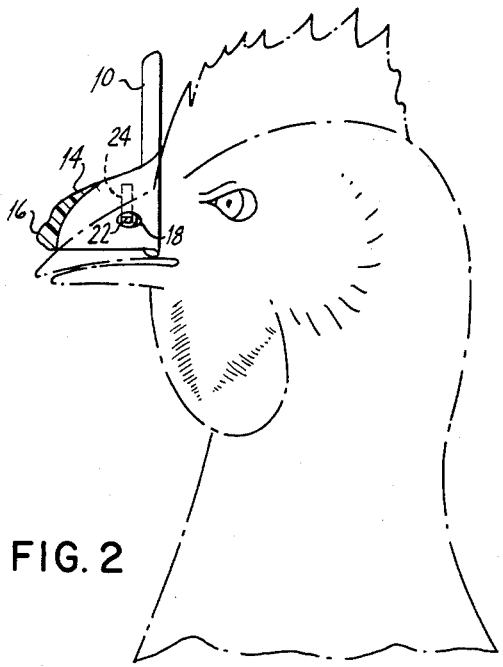
Figure 3:
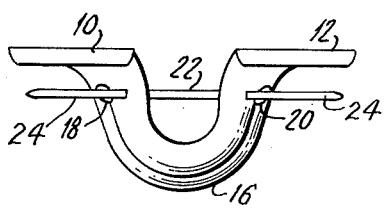
Figure 4:
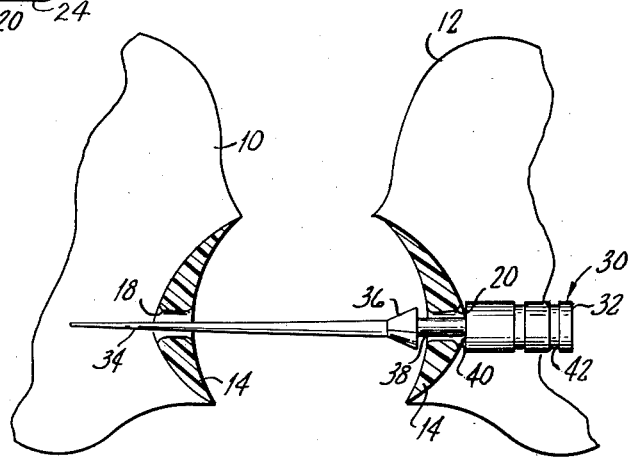
Figure 5:
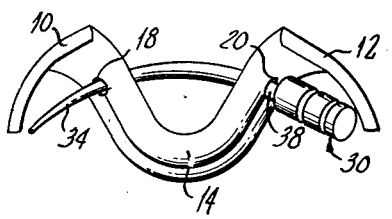

We accomplish these and other objects and obtain our new results as will be apparent from the devices described in the following specification, particularly pointed out in the claims, and illustrated in the accompanying drawing in which:

FIGURE 1 is a front elevation of our poultry blinder with inserted fastener,

FIGURE 2 is a side elevation of the blinder and fastener, mounted on the beak of a chicken, with the bridge portion of the binder shown in cross-section, FIGURE 3 is a top plan view of the blinder and fastener, FIGURE 4 is a partial sectional front elevation taken through the apertures of the blinder and drawn to an enlarged scale, showing another type of fastener, and FIGURE 5 is a top plan view drawn to a reduced scale, showing the poultry blinder and fastener of FIGURE 4 in flexed position.

Our poultry blinder is preferably made of flexible plastic material such as polyethylene. A blinder of this material can be easily flexed when it is pulled against a wire mesh. It is molded in the form shown, with two flat plate portions 10 and 12, connected by a bridge portion 14.

As is shown in FIGURE 2, the bridge portion is hollow to permit resting on the top of the beak. A outwardly extending ridge or positioning means 16 may be formed peripherally around the bridge to strengthen it without materially adding to its weight.

Two apertures 18 and 20 are formed in the blinder, adjacent the flat plate portions to permit entrance of a fastener 22 therethrough. The apertures are formed so that they axially align themselves with the nostrils in the poultry beak, when the blinder is in position.

The fastener is then forced entirely through apertures, nostril, and nostril membrane capturing the blinder in position on the beak with the flat plates upright in front of the eyes of the bird preventing forward vision.

It has been found that the bird easily trains itself to eat and drink freely despite the presence of the blinders.

The fastener is self-locking. This is accomplished in the fastener shown in FIG. 1 by forming the fastener 22 of springy material either of plastic or of metal with at least one outwardly extending leg 24 or suitable catch which can be depressed into alignment with the fastener body for entrance through the apertures and nostrils. When the pressure is released on the leg, it automatically springs outwardly preventing removal until depressed back into alignment.

A further form of fastener 30 is shown in FIGURE 4, provided with a head 32 at one end and a pointed leg 34 at the other end. This construction may be preferred for the ease with which it may be passed through the membrane between the nostril openings in the poultry.

The fastener 30 is provided with a catch 36 spaced from the head 32 to permit snapping the fastener 30 through one of the openings such as 20 causing the material of the blinder to engage the catch. The fastener is reduced in diameter, as at 38 to accommodate the material of the blinder between the catch and the head.

The pointed end of the fastener freely extends through the remaining opening of the bridge for a sufficient distance to allow the blinder to be adequately flexed without loss of position. The fastener may be made of metal or of stiffly flexible plastic such as nylon to permit flexing without loss of the self locking feature. The flexible material of the blinder assists in the snap action. The entrance 40 to each opening may be rounded to facilitate entrance of the catch. The other edge of the opening will resist withdrawal.

FIGURE 5 illustrates the flexed position of the blinder and fastener when the bird attempts to withdraw its head. The wire easily slides off the blinder without damage to the beak. The flexible feature also protects the chicken from injury if it deliberately attempts to remove the blinder.

The head of the fastener may be grooved, as at 42 or otherwise surfaced so as to provide a finger hold when inserting the fastener into the blinders.

We have thus described our invention, but we desire it understood that it is not confined to the particular forms shown and described, the same being merely illustrative, and that the invention may be carried out in other ways without departing from the spirit of our invention, and therefore we claim broadly the right to employ all equivalent instrumentalities coming within the scope of the appended claims, and by means of which objects of our invention are obtained and new results accomplished since the particular embodiments herein shown and described are only some of the many that can be employed to obtain these objects and accomplish these results.

We claim:

1. A poultry blinder having a pair of plate-like portions and positioning means for enabling the plate-like portions to cover the eyes of poultry, and a pointed fastener extending through the positioning means, and having a catch to support the plate-like portions on the beak of poultry, said fastener being made of easily flexed material capable of flexing when the plate-like portions are caught in a wire mesh, and when pulled by the head of a chicken, of deforming sufficiently to release the plate-like portions from the mesh, and of self return thereafter to its original position, to bring the plate-like portions to the front of the eyes of the poultry.

2. The poultry blinder of claim 1, wherein the fastener is formed with a flexible leg at the end of the point capable of being compressed when inserted through the nostrils and the positioning means of poultry and of self opening thereafter to prevent removal therefrom.

3. The poultry blinder of claim 1 wherein the plate-like portions and positioning means are made of flexible material capable of self return when deformed.

4. The poultry blinder of claim 1 wherein the positioning means are provided with openings through which the pointed fastener extends.

References Cited in the file of this patent

UNITED STATES PATENTS

| | | |
|---|---|---|
| 703,945 | Moody | July 1, 1902 |
| 2,181,070 | Rudolph | Nov. 21, 1939 |
| 2,345,325 | Churchill | Mar. 28, 1944 |
| 2,445,867 | Wolfson et al. | July 27, 1948 |
| 2,718,213 | Bartner | Sept. 20, 1955 |